United States Patent [19]
McCreary

[11] Patent Number: 5,087,150
[45] Date of Patent: Feb. 11, 1992

[54] METHOD OF CONSTRUCTING A SEAWALL REINFORCEMENT OR JETTY STRUCTURE

[76] Inventor: Donald R. McCreary, 240 Brightwaters Blvd., NE., St. Petersburg, Fla. 33704

[21] Appl. No.: 504,295

[22] Filed: Apr. 4, 1990

Related U.S. Application Data

[63] Continuation-in-part of Ser. No. 420,299, Oct. 12, 1989, abandoned.

[51] Int. Cl.⁵ ............................ E02B 3/04; E02B 3/06; E04C 1/10
[52] U.S. Cl. ........................................ 405/31; 405/16; 405/17; 405/25; 405/285; 52/606
[58] Field of Search ........ 405/15, 16, 17, 21, 405/25, 29–33, 284, 285, 262; 52/606, 604, 605

[56] References Cited

U.S. PATENT DOCUMENTS

| | | | |
|---|---|---|---|
| 2,191,924 | 2/1940 | Humphrey | 405/33 |
| 2,833,532 | 5/1958 | Ries | 52/606 X |
| 2,881,613 | 4/1959 | Taylor et al. | 52/604 X |
| 4,175,888 | 11/1979 | Ijima | 405/31 |
| 4,186,540 | 2/1980 | Mullins | 52/606 X |
| 4,479,740 | 10/1984 | Schaaf et al. | 405/30 |
| 4,856,935 | 8/1989 | Haras | 405/35 |

FOREIGN PATENT DOCUMENTS

| | | | |
|---|---|---|---|
| 398721 | 2/1974 | U.S.S.R. | 405/15 |
| 829762 | 5/1981 | U.S.S.R. | 405/15 |

*Primary Examiner*—Dennis L. Taylor
*Assistant Examiner*—John A. Ricci
*Attorney, Agent, or Firm*—Herbert W. Larson

[57] ABSTRACT

A weighed water permeable fabric is laid over a bottom sediment and an adjacent seawall structure. A layer of integral paired star-shaped blocks is laid over the bottom covering fabric in an interrelated pattern in a horizontal and vertical plane. A bore is located within each star-shaped portion of the block and these bores are aligned with corresponding bores in blocks mounted vertically. A concrete piling is drilled or poured in place through the bores to the bottom sediment to hold the structure in place against severe storm surges and resist outward movement of the seawall.

20 Claims, 8 Drawing Sheets

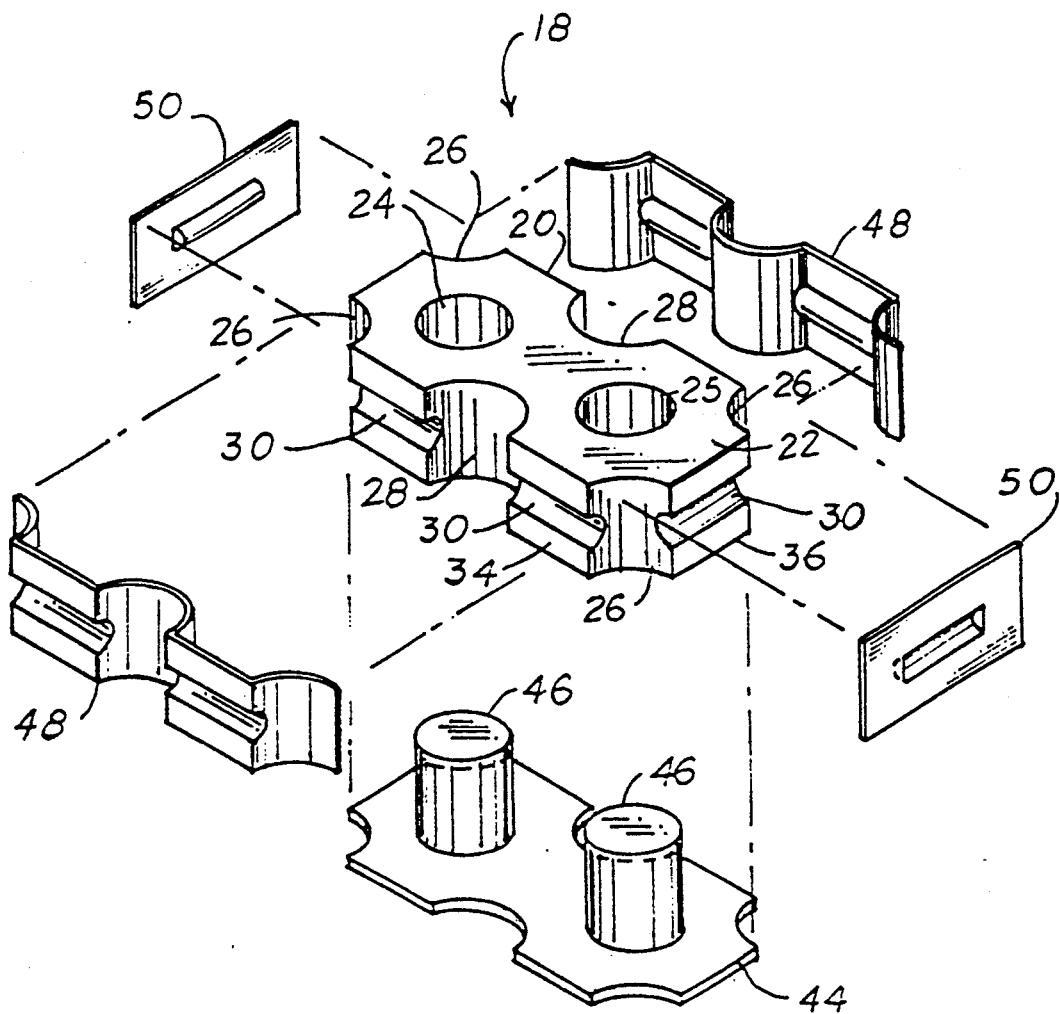
Fig_5
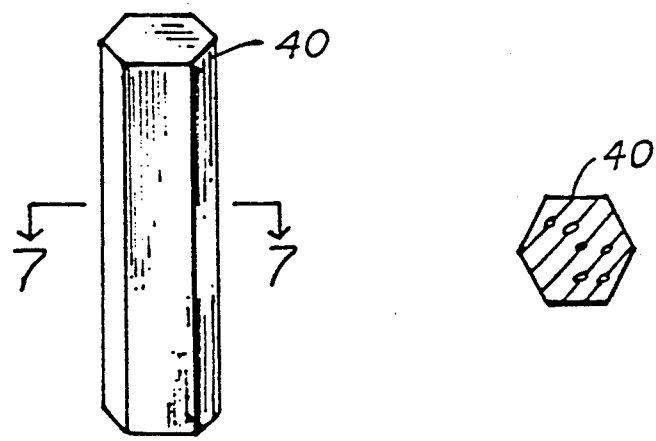
Fig_6   Fig_7

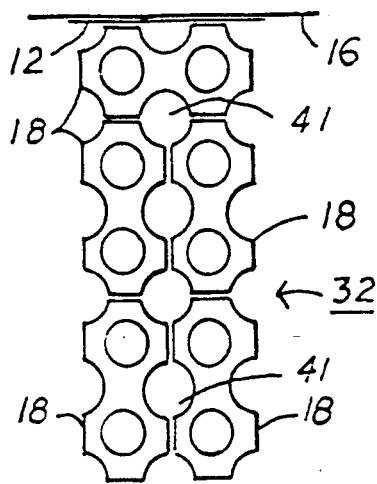
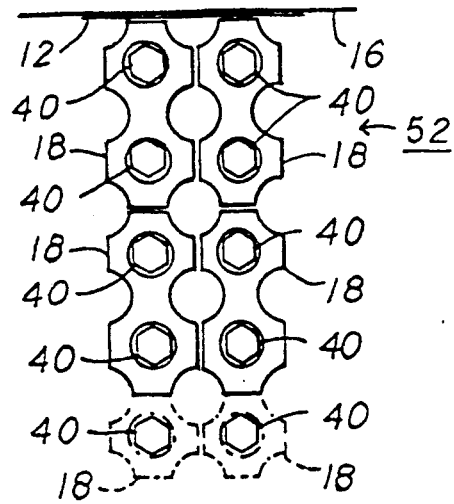
Fig_8    Fig_9
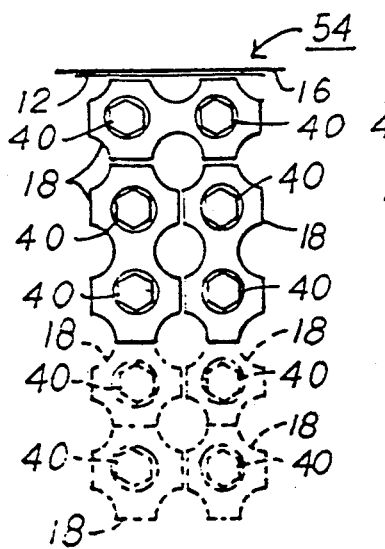
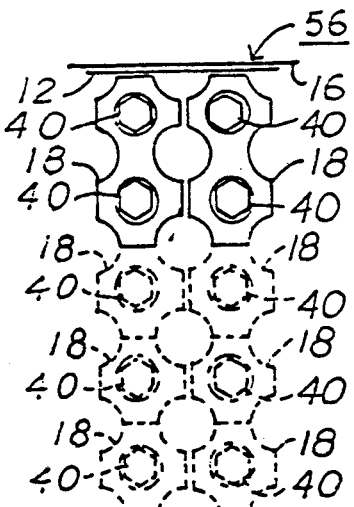
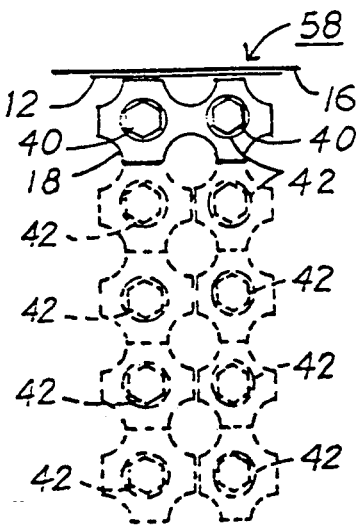
Fig_10    Fig_11    Fig_12

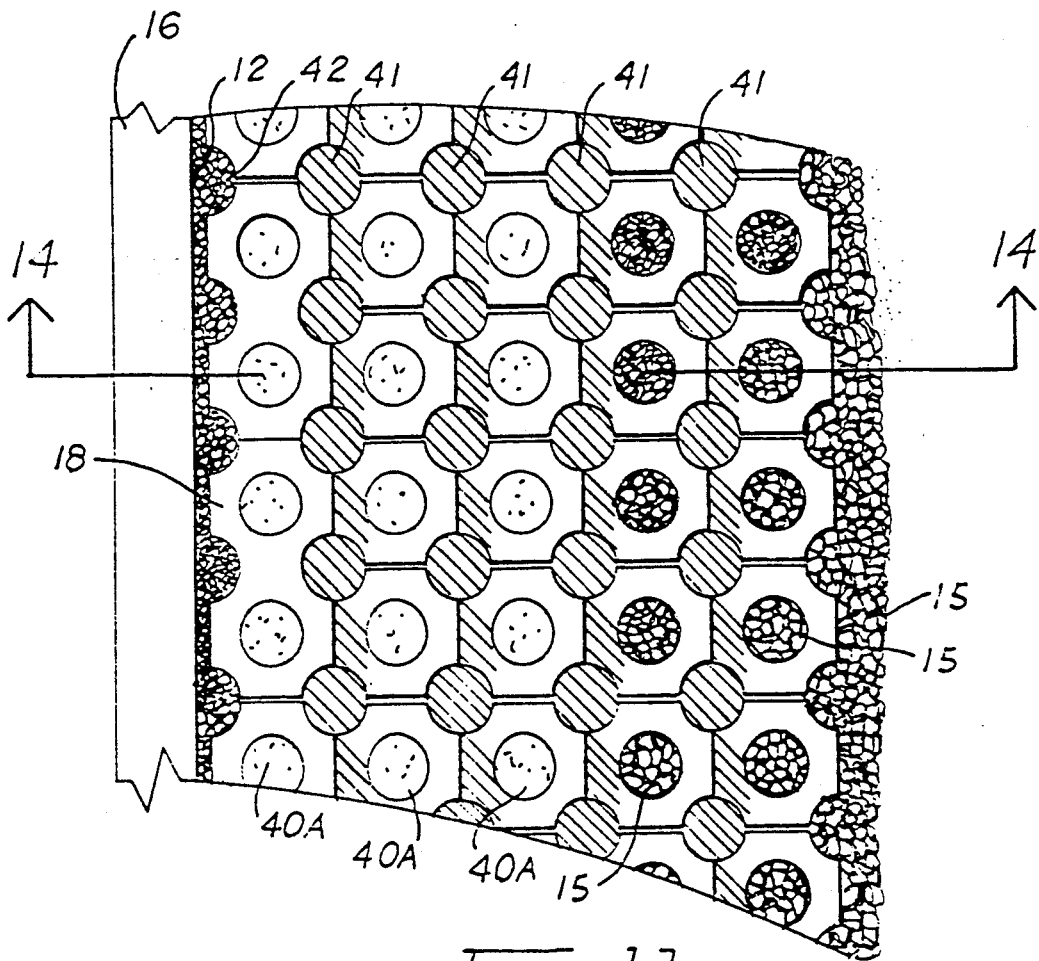
Fig_13
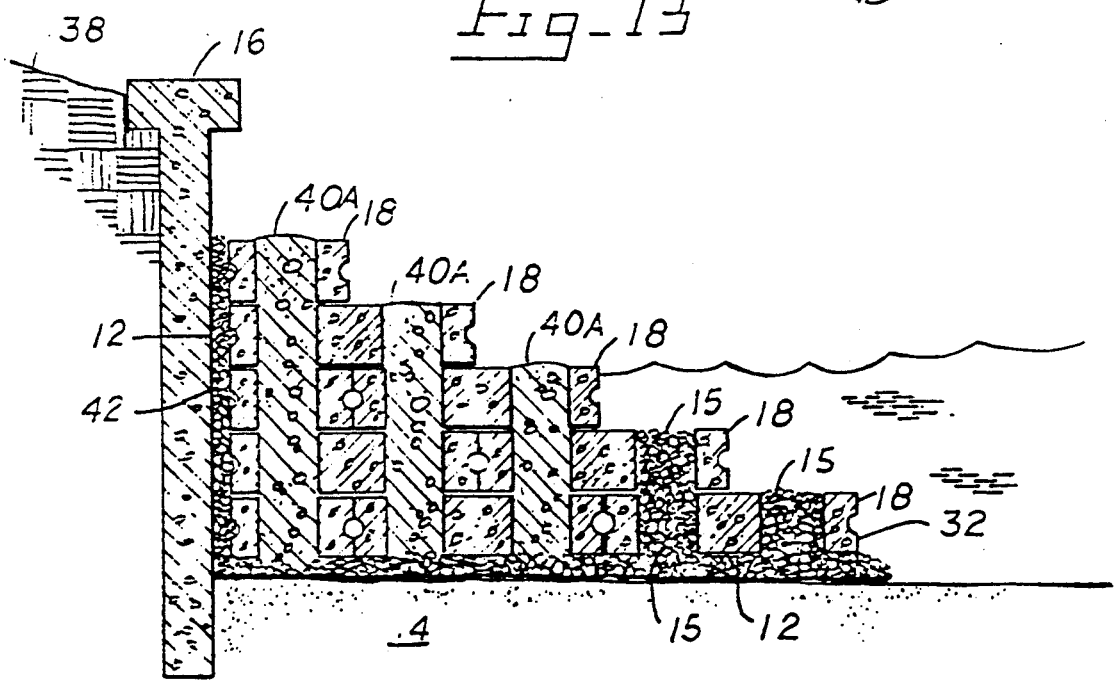
Fig_14

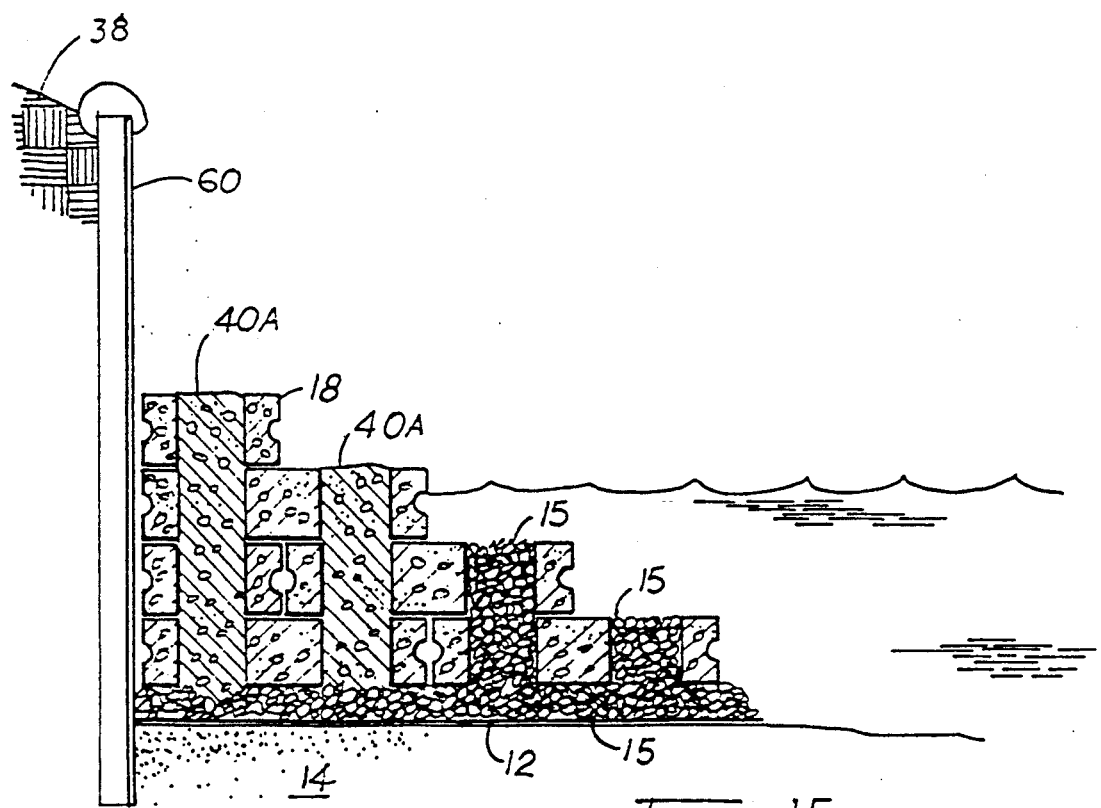
Fig_15
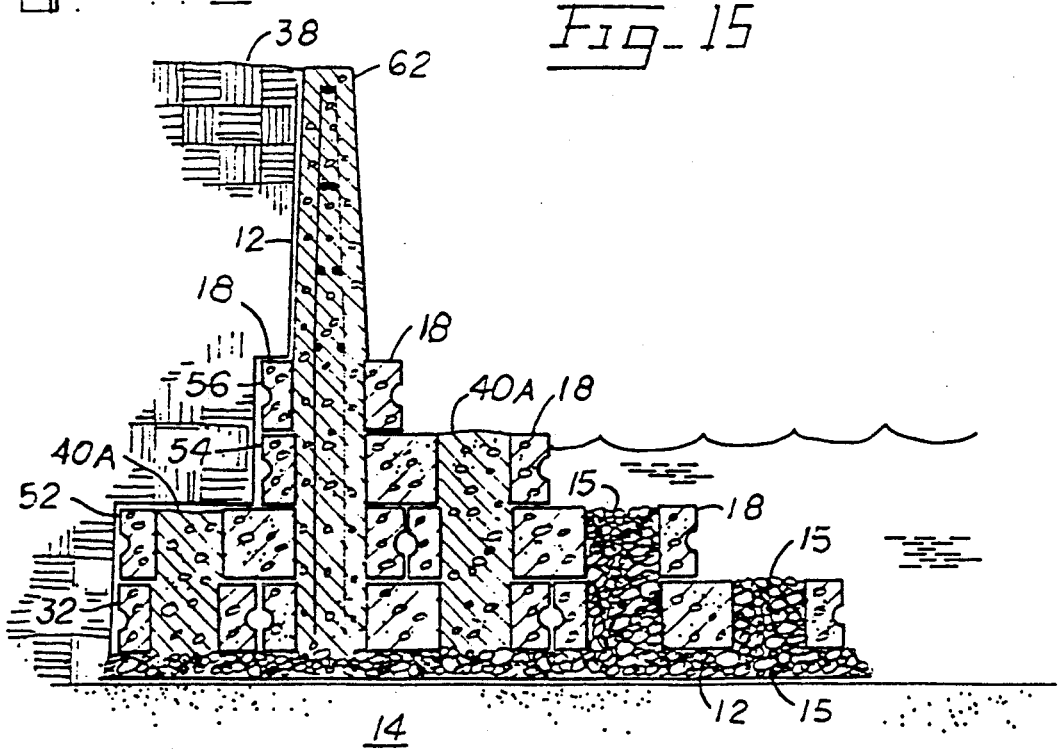
Fig_16

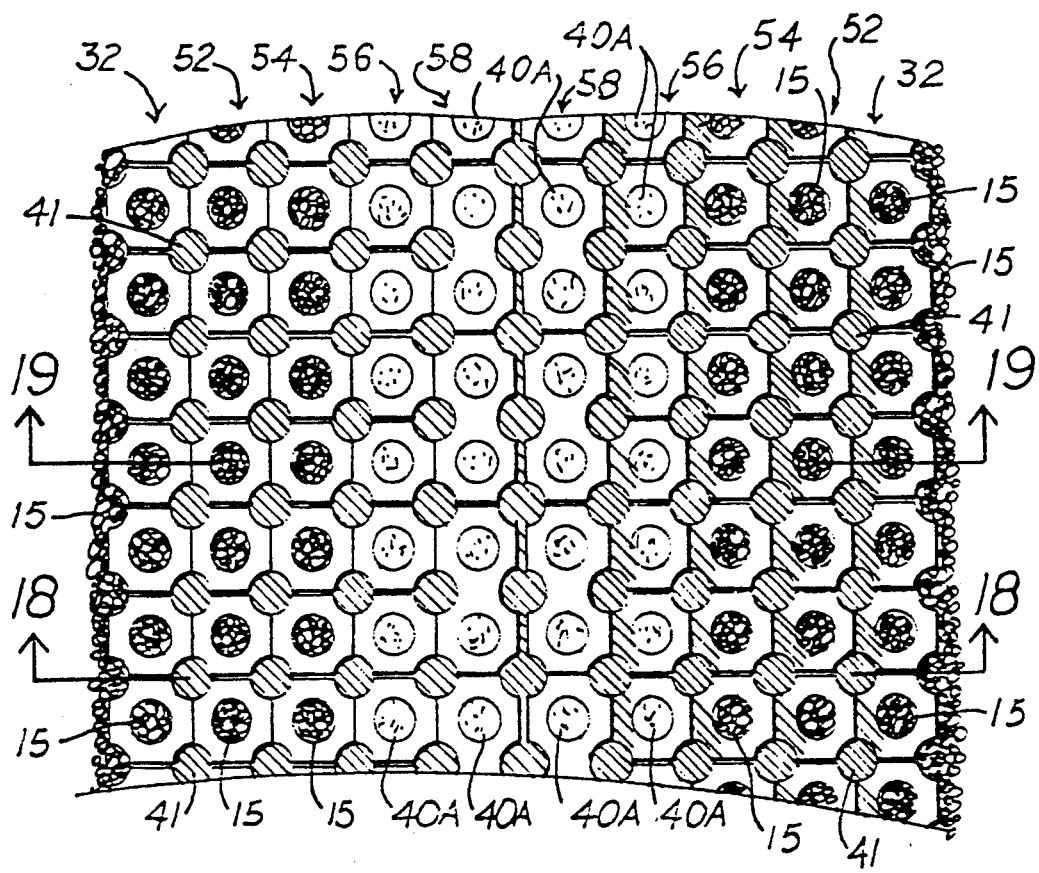
Fig_17
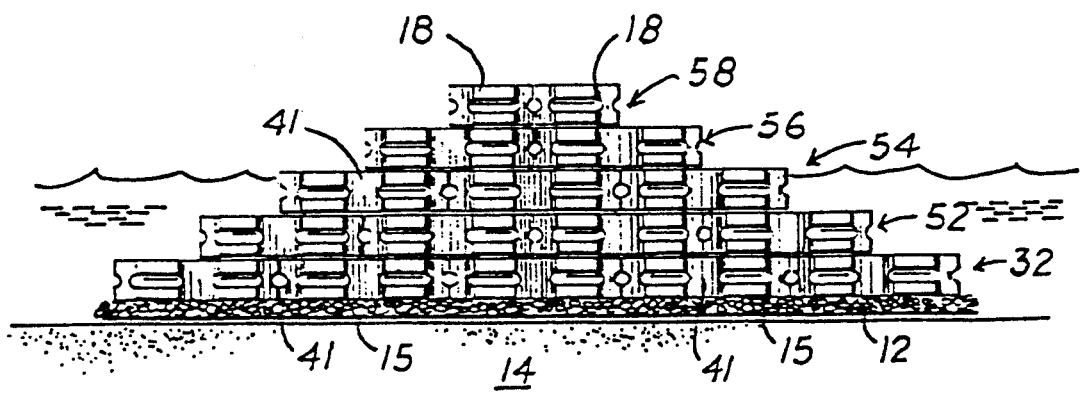
Fig_18

METHOD OF CONSTRUCTING A SEAWALL REINFORCEMENT OR JETTY STRUCTURE

PRIOR APPLICATION

This application is a Continuation-In-part of my application Ser. No. 07/420,299, Filed Oct. 12, 1989, now abandoned.

BACKGROUND OF THE INVENTION

1. Field of the Invention

This invention relates to wave barriers and seawalls. More particularly, it refers to a method of constructing a wave barrier and seawall reinforcement from interlocking blocks held in place by pilings.

2. Description of the Prior Art

Erosion control blocks having one or more openings through the blocks are known from U.S. Pat. Nos. 4,073,145; 4,175,888; 4,413,924 and 4,479,740. The blocks described in the aforementioned patents are laid in a pattern over a bottom structure in a manner to present the openings within the blocks to the force of incoming water. The purpose of this pattern is to dissipate the incoming wave force. This pattern acts to prevent erosion along shorelines but is not satisfactory to protect wave barriers and seawalls from strong storm surges nor to reinforce the seawall itself since the blocks can be upended and moved by the force of a strong wave. A method of protecting a wave barrier and seawall against a strong wave and reinforcing the seawall against movement due to soil and hydraulic pressures and erosion force is needed.

SUMMARY OF THE INVENTION

I have invented a method of constructing a wave barrier and seawall reinforcement structure which protects seawalls against storm surges and prevents movement of the seawall itself. In addition, erosion of the soil outside the seawall is prevented. In addition, my method can be used to construct wave barriers such as jetties.

My method is carried out by applying a weighted fabric over a bottom sediment and an adjacent seawall structure. A layer of concrete blocks is laid horizontally over the sediment covering fabric and abutting the seawall base. Multiple vertical layers of concrete block are applied over the first layer. Each block has a four prong star-like structure in integral paired relationship. A vertical bore is located within each star-like structure. The bore of each block is aligned with the bore of a corresponding block in a vertical plane. A cement piling is drilled through the bores into the bottom sediment to hold the structure in place against severe storm surges and to resist outward movement of the seawall. A variation of this method is used to construct a jetty by interconnecting vertical and horizontal interior spaces within the blocks. The cement piling holding the blocks from movement is poured in place.

BRIEF DESCRIPTION OF THE DRAWINGS

The invention may be best understood by those having ordinary skill in the art by reference to the following detailed description when considered in conjunction with the accompanying drawings in which:

FIG. 5 is an exploded view of a mold used to make the concrete block of FIG. 1.

FIG. 6 is a front view in elevation of a piling used in this invention.

FIG. 7 is a section view along lines 7—7 of FIG. 6 of a piling used in this invention.

FIG. 8 is a top plan view of a first layer of blocks applied in the method.

FIG. 9 is a top plan view of a second layer of block with the visible first layer of blocks shown in phantom.

FIG. 10 is a top plan view of a third layer of blocks with the visible first and second layer shown in phantom.

FIG. 11 is a top plan view of a fourth layer of block with the visible first, second and third layers shown in phantom.

FIG. 12 is a top plan view of the fifth layer showing the single block added with the visible first, second, third and fourth layers shown in phantom.

FIG. 13 is a plan view of a repaired bulkhead with seawall reinforcement blocks.

FIG. 14 is a section view in elevation along lines 14—14 of FIG. 13 of a repaired concrete bulkhead with seawall reinforcement blocks.

FIG. 15 is a section view in elevation of a repaired aluminum bulkhead with seawall reinforcement blocks.

FIG. 16 is a section view of a cast in place concrete seawall with seawall enforcement blocks on each side.

FIG. 17 is a plan view of a jetty construction with the reinforcement blocks of this invention.

FIG. 18 is a sectional view along lines 18—18 of FIG. 17 showing a side elevation of a jetty configuration.

DETAILED DESCRIPTION OF THE INVENTION

Figure 1:
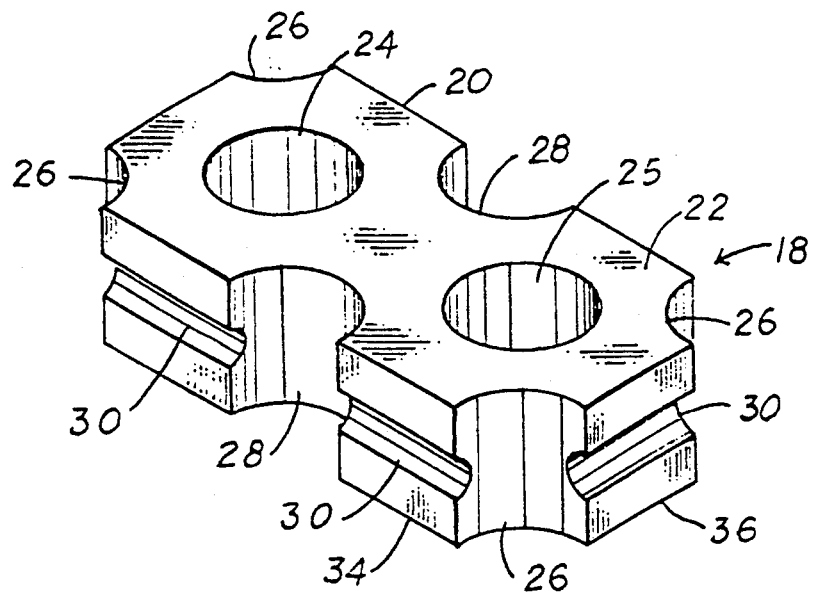
FIG. 1 is a perspective view of the block used in the method of this invention.

Throughout the following detailed description, the same reference numerals refer to the same elements in all figures.

Figure 4:
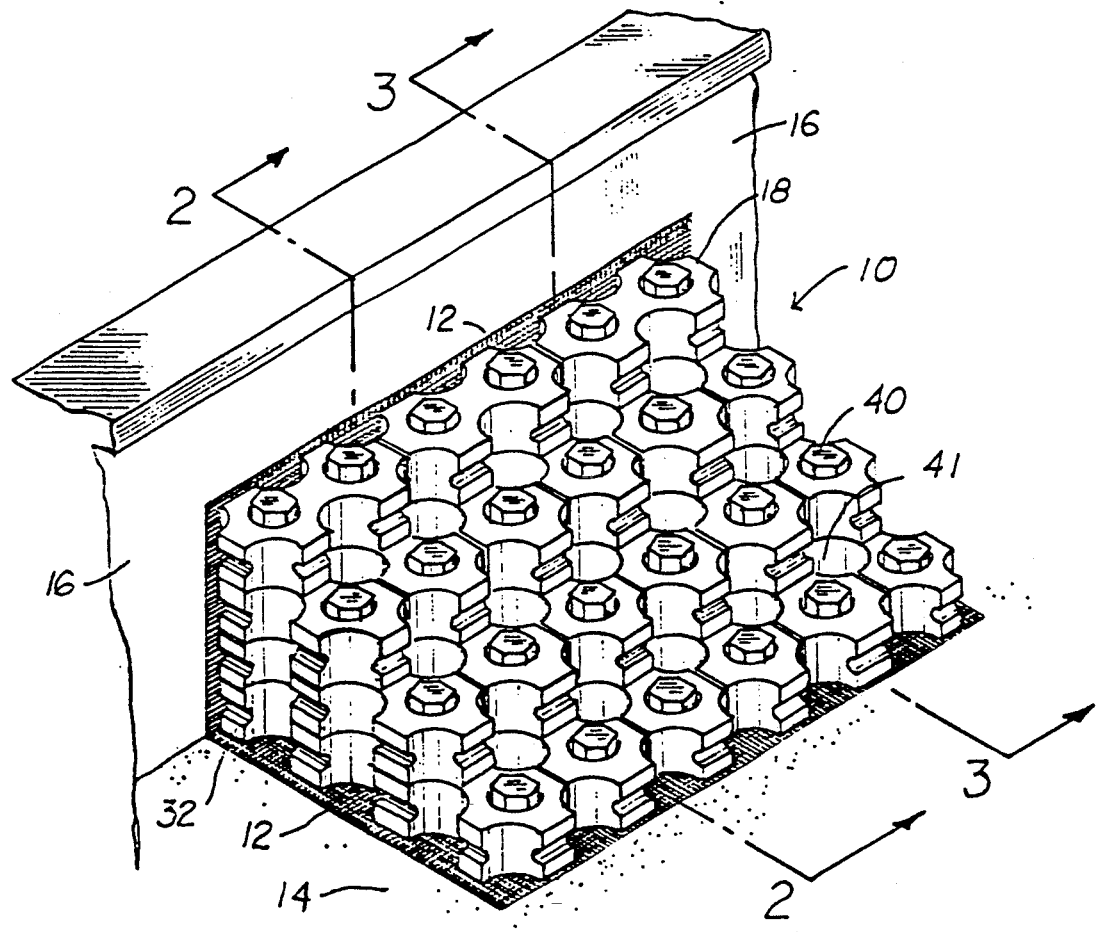
FIG. 4 is a perspective view of a seawall reinforcement structure made from the method of this invention.

The seawall reinforcement structure 10 created by the method of this invention is shown in FIG. 4. In carrying out the method of this invention, a filter fabric 12 is laid over a sediment layer 14 and up against a seawall 16. The vertical portion of fabric 12 is tacked into the seawall 16. The horizontal portion of the filter fabric 12 placed over the sediment 14 is weighted to prevent it from floating up. Optionally, crushed stone 15 as seen in FIG. 14 is laid over the filter fabric to even out the sediment layer 14.

Thereafter, a horizontal layer 32 of blocks 18 as shown in FIG. 8, is laid over the horizontal sediment covering layer of filter fabric 12 or crushed stone 15.

The block 18 shown in FIG. 1 is described as a pair of four-sided star-shaped integral members 20 and 22. Each star-shaped portion 20 and 22 has a central bore 24 and 25, respectively through the block 18 in a vertical configuration. The size of the block 18 can vary but usually has a width of eighteen inches, a thickness of nine inches and a length of about three feet. The block is made from approximately sixty percent solids (concrete) and has about forty percent voids. The exact composition of the concrete block depends upon the availability of materials. Each corner of the block 18 has a quarter circle 26 and each side has a semi-circle 28, having a diameter between its widest edges of about nine inches. Smaller semi-circular grooves 30 are located on all the sides of the block 18.

The first layer 32 of blocks 18 are laid so that the first row of blocks abut the seawall 16 and proceeds outwardly from the seawall in a precise pattern. In a five high configuration the first row of blocks are laid along a long edge 34 in a parallel relationship to the seawall as shown in FIG. 8. The next abutting block in the horizontal plane is placed in a perpendicular direction to the first row of blocks so that the narrower end 36 of the blocks are abutting the first row of blocks. The next block in a horizontal plane is also laid so that its shorter edge 36 abuts the next adjacent row of the blocks. A second layer of blocks 52 (FIG. 9) is laid above the first horizontal layer 32 so that the short end portion 36 of the second layer 52 first row abuts the seawall. Each bore 24 and 25 is aligned with the bore of the block beneath it from the first layer 32.

Successive layers of blocks are added as seen in FIGS. 10-12 until the proper height is achieved. Whether four layers of blocks, as shown in FIG. 4, or whether five layers or more are used, the number of blocks on each vertical layer is reduced in a horizontal configuration so that a step-type configuration is achieved as shown in FIG. 4. The blocks are proportioned to achieve a two horizontal to one vertical slope.

Figure 2:
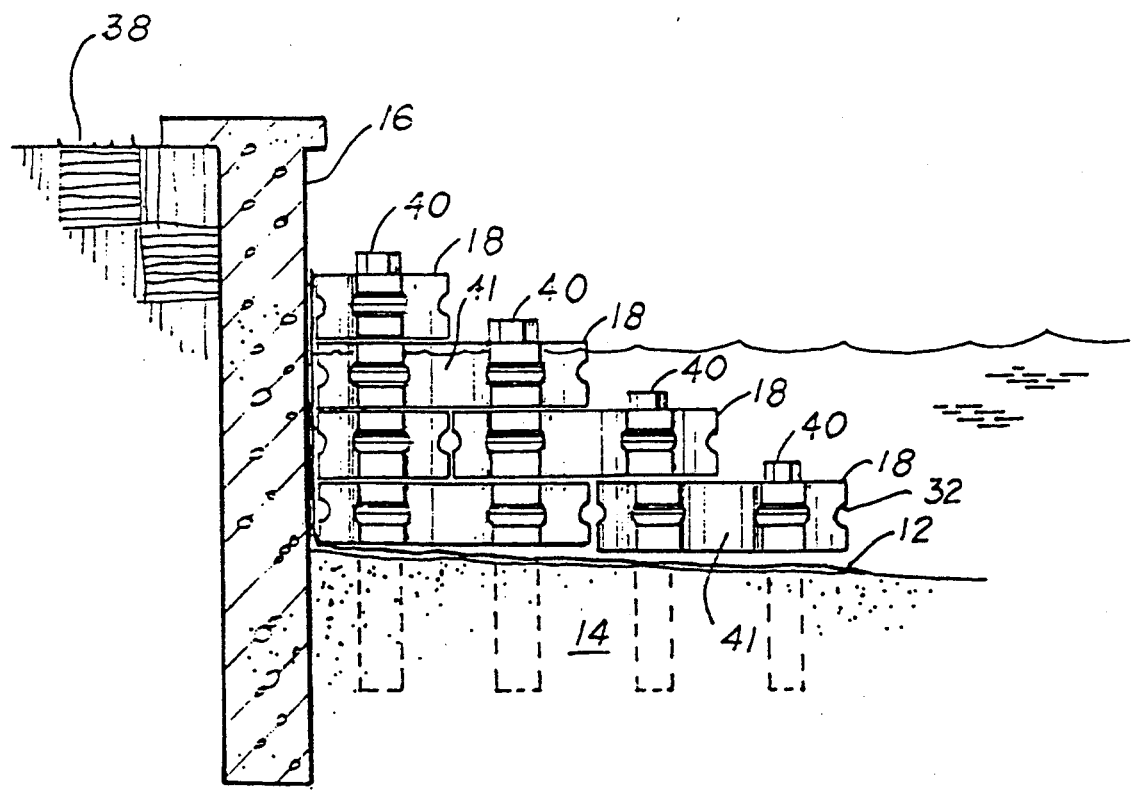
FIG. 2 is a side elevation in section along lines 2—2 of FIG. 4 of a seawall reinforcement structure made from the method of this invention.

Concrete pilings 40 preferably having a hexagonal shape as shown in FIGS. 6 and 7 and a diameter of about six inches are drilled through the bores 24 and 25 down through the sediment 14 to a depth of approximately two feet below the filter fabric 12. The piling 40 is inserted after the first two layers 32 and 52 of block are applied. The piling can be drilled to an even deeper depth as desired for added structural integrity. The concrete pilings are preferably jetted into the sediment layer below the filter fabric 12. The drilling configuration of the pilings is shown in FIG. 2.

Figure 3:
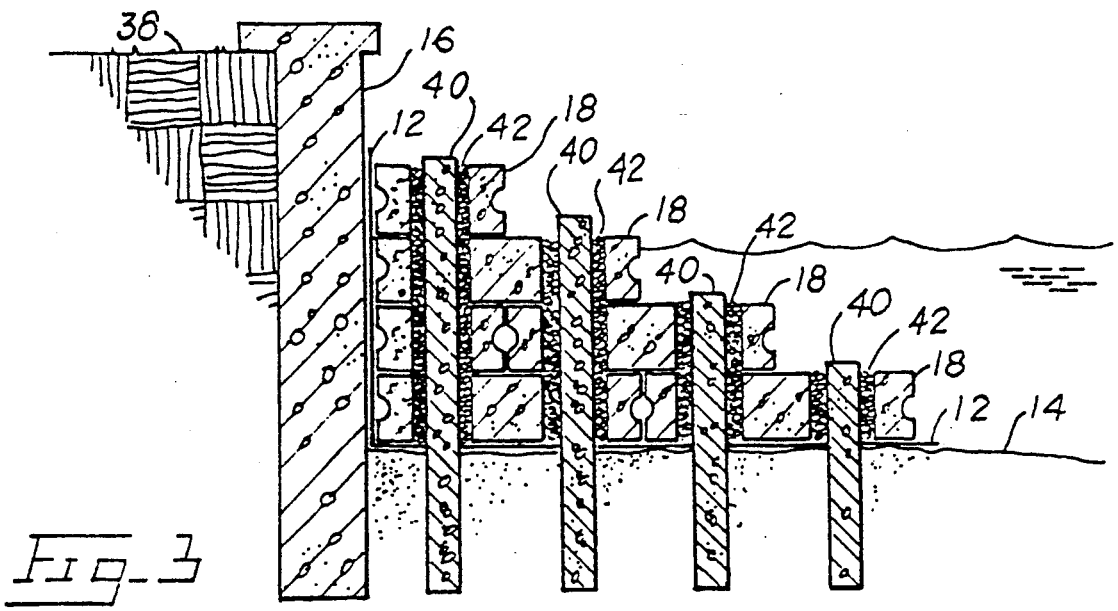
FIG. 3 is a side elevation in section along lines 3—3 of FIG. 4 of a seawall reinforcement structure made from the method of this invention.

Grout or gravel 42, as seen in FIG. 3, is added around the pilings along the edges of bores 24 and 25 to prevent relative movement of the pilings and blocks.

The concrete blocks 18 employed in this method can be constructed on site using a type of frame shown in FIG. 5. A wood base 44 has a pair of metal cylinders 46. A longitudinal frame 48 and end frames 50 are placed around the base 44. Concrete of the proper consistency is added to the mold and after setting, produces the block 18 as shown in FIG. 5. By constructing the blocks on site, the cost of shipping heavy three foot blocks is reduced and the overall cost of construction is thereby reduced.

The filter fabric 12 used in this invention is a water permeable filter fabric normally made from a plastic material such as polyethylene or polypropylene.

The slope of the preferred configuration of the structure 10 is two to one, employing a starting configuration of five blocks high. However, the configuration as shown in FIG. 4 with a height of four blocks is also satisfactory. The height of the seawall will determine the exact number of blocks in a vertical configuration. However, the blocks are proportional to achieve a two horizontal to one vertical slope, at a point distal from the seawall, no matter how many layers are used.

As seen in FIGS. 13 and 14 crushed stone 15 can be used to even out the sediment 14 and can be used in the bores of the most seaward blocks 18 instead of cast in place pilings 40A. Voids 41 can be left open to baffle incoming water and provide a habitat for sea creatures.

The structure constructed according to this invention has no steel or other metal which can deteriorate in a salt water environment. The structural integrity of the structure created by this method will withstand severe storm surges. Although such surges may ride over the seawall, the surge will not cause the collapse of the seawall even if fill behind the seawall is eroded away.

Aluminum bulkheads 52 as shown in FIG. 15 can be repaired or supported by the same method of this invention.

A cast in place concrete seawall 62 such as seen in FIG. 16 can be assembled using the method of this invention. The seawall is formed in a space between opposing blocks 18. A less extensive series of layers 32, 52, 54 and 56 is employed on the land or fill 38 side of the seawall 62. The same series of layers as seen in FIGS. 2-4 is used on the seaward side of the seawall 62. The filter fabric 12 is extended upward along the edges of the blocks 18 facing the fill 38.

Figure 19:
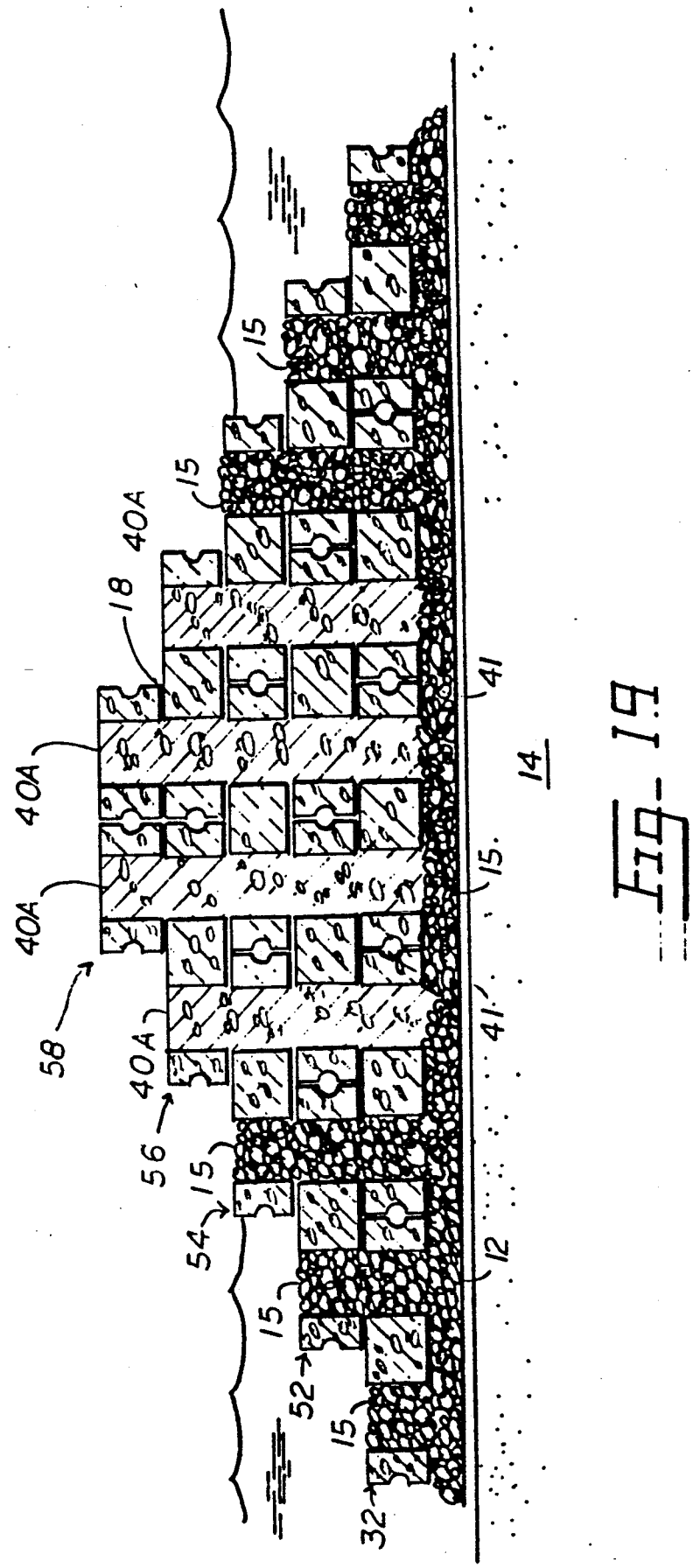
FIG. 19 is a section view in elevation of a jetty along lines 19—19 of FIG. 17.

FIGS. 17-19 show an alternate embodiment of this invention in which a free standing jetty is created by employing the methods of this invention. A filter fabric 12, is laid down with a layer of crushed stone 15 over the fabric. The blocks 18 are laid out in a pattern as shown in FIGS. 17-19. Crushed stone 15 is placed in bores 24 and 25 of the most exterior blocks 18 and cast in place concrete pilings 40A are employed in the centrally located blocks. Voids 41 formed between abutting blocks are left to baffle the incoming waves and provide sea life habitat. A tremie, which is a tube for placing concrete under water, is placed in each bore 24 or 25 prior to commencing the pumping of concrete. As the concrete settles within the blocks, the tremie is removed.

A connecting block shown in FIG. 19 connects one descending section of blocks to the opposite descending section of blocks. Concrete pilings poured in place through the aligned bore holes maintain structural integrity between the two sections. The descending sections are usually positioned so that one section faces incoming WaVes and the other section faces the leeward side.

Equivalent design pilings and other style blocks can be used in my invention without deviating from the method described and will still substantially create the same structural configuration to withstand seVere storm surges and prevent movement of the seawall due to soil and hydraulic pressures.

Having thus described the invention, what is claimed and desired to be secured by Letters Patent is:

1. A method of constructing a wave barrier structure comprising
   applying a weighted water permeable fabric over a bottom sediment,
   applying to the fabric located over the bottom sediment a first layer of concrete blocks, the blocks having a pair of vertical bores,
   the first layer of concrete blocks being applied to abut each other in adjacent horizontally rows with one edge of each block in a first row being applied to abut a solid vertical structure,
   a second vertical layer of blocks being applied to abut over the first horizontal layer of blocks, an edge of each block in a first row in the second layer being applied to abut the solid vertical structure and a bore in the blocks of the second layer being aligned with a bore in a first layer of blocks, successive vertical layers of blocks being aligned to a next lower layer in the same manner as the layer of blocks directly beneath the next lower layer, with each higher layer of blocks having at least one less horizontal row and placing a concrete piling through the bores of multiple vertical continuous layers of blocks.

2. The method according to claim 1 wherein the fabric applied to the sediment is polyethylene.

3. The method according to claim 1 wherein the fabric applied to the sediment is polypropylene.

4. The method according to claim 1 wherein the concrete block in each layer has grooves along each outer edge.

5. The method according to claim 1 wherein the blocks applied are integral pairs of four sided star-like structures forming a rectangular shape with a vertical bore centrally located within each star.

6. The method according to claim 1 wherein the blocks are applied in successive vertical layers proportionally to achieve a two horizontal to one vertical slope.

7. The method according to claim 1 wherein gravel fill is added around a space between each piling, an inner edge of the bore and over the top of the fabric.

8. A method of constructing a seawall reinforcement structure comprising applying a weighted water permeable fabric over a bottom sediment and an adjacent seawall structure, applying to the fabric located over the bottom sediment a first layer of concrete blocks, the blocks having a structure rectangular in shape with a pair of vertical bores, the first layer of concrete blocks being applied to abut each other in adjacent horizontal rows with one edge of each block in a first row being applied to abut the seawall, a second vertical layer of blocks being applied to abut over the first horizontal layer of blocks, an edge of each block in a first row in the second layer being applied to abut the seawall and a bore in the blocks of the second layer being aligned with a bore in a first layer of blocks, successive vertical layers of blocks being aligned to a next lower layer in the same manner as the layer of blocks directly beneath the next lower layer, with each higher layer of blocks having at least one less horizontal row, erecting a concrete piling through the bore of multiple vertical continuous layers of blocks.

9. The method according to claim 8 wherein there are five vertical layers of concrete block applied adjacent the seawall and the vertical layers of block are proportioned to achieve a two horizontal to one vertical slope at a point distal from the seawall.

10. The method according to claim 8 wherein there are four vertical layers of concrete block applied adjacent the seawall and the vertical layers of block are proportioned to achieve at a point distal from the seawall a two horizontal to one vertical slope.

11. The method according to claim 8 wherein the blocks applied have an integral pair of a four sided star-like structure with each bore located in a center of the star.

12. The method according to claim 8 wherein gravel fill is added around a space between each piling and an inner edge of the bore.

13. A concrete block structure for use in seawall reinforcement comprising a rectangular shape having an integral pair of four sided star-like configurations with a vertical bore centrally located within each star from a top to a bottom surface and a latitudinal groove along each exterior side surface of the block to form a channel for passage of water when abutted against a like surface of an identical concrete block structure, the latitunal groove being parallel to the top and bottom surfaces, each corner of the block having a quarter round circle and the mid-portion of each long side of the block having a semi-circle along an exterior surface.

14. A method of constructing a wave barrier comprising applying a weighted water permeable fabric over a bottom sediment in a preselected area, applying to the fabric a sediment leveling quantity of crushed stone, applying over the crushed stone a first section of concrete blocks containing multiple layers of concrete blocks, each block having a pair of vertical bores, applying a second vertical layer of blocks over the first layer and aligning bores of the second layer of blocks with bores in the first layer of blocks, applying successive vertical layers of blocks in alignment to a next lower layer in the same manner as the layer of blocks directly beneath the next lower layer, with each higher layer of blocks having at least one less horizontal row facing incoming waves, applying a second section of concrete blocks in the same manner as the first section but each reduced horizontal row of blocks applied to face a leeward side from the first section of blocks, applying a row of connecting blocks to connect each section of blocks, with each respective bore of the connecting block aligned with a bore in a lower and upper layer in abutting sections, and erecting a concrete piling through the bores of multiple vertical continuous layers of blocks to the fabric.

15. A method of constructing a wave barrier according to claim 14 wherein the concrete pilings are poured in place through the bore holes in connecting blocks and in at least the first two bore holes in each layer proximate to the same two bore holes in the adjacent section.

16. A method of constructing a wave barrier according to claim 15 wherein crushed stone is applied to each bore hole not filled with concrete.

17. A method of constructing a wave barrier according to claim 16 wherein each block has a rectangular shape with each corner of the block having a quarter round circle and the mid-portion of each long side of the block having a semi-circle along an exterior surface so that abutting blocks form voids which act as wave baffles and habitat for sea creatures.

18. A method of constructing a wave barrier according to claim 14 wherein the water permeable fabric is polyethylene.

19. A method of constructing a wave barrier according to claim 14 wherein the water permeable fabric is polypropylene.

20. A method of constructing a wave barrier according to claim 14 wherein there are at least five layers of blocks in each section with a bore from a connecting bock in alignment with a bore from a block in a layer of blocks in each section directly above and below the connecting block.

* * * * *